United States Patent [19]

Hays

[11] Patent Number: 5,375,688
[45] Date of Patent: Dec. 27, 1994

[54] AUTOMOTIVE CLUTCHES

[76] Inventor: Bill J. Hays, 15114 Adams St., Midway City, Calif. 92655

[21] Appl. No.: 69,388

[22] Filed: Jun. 1, 1993

[51] Int. Cl.⁵ .................. F16D 13/50; F16D 13/71
[52] U.S. Cl. ................ 192/70.27; 192/89.22; 192/89.23; 192/110 B
[58] Field of Search ........... 192/70.27, 110 B, 89 BL, 192/89 PL, 89 PH, 89.22, 89.23, 89.24; 384/614

[56] References Cited

U.S. PATENT DOCUMENTS 1,353,044  9/1920  Keiper .................... 384/614 X
3,216,543  11/1965  Schröter ................ 192/89 BL X

FOREIGN PATENT DOCUMENTS 2222570  10/1974  France ..................... 192/89 B
1425400  2/1969  Germany .................. 192/89 B
3419833  11/1985  Germany .................. 192/89 B Primary Examiner—Richard M. Lorence
Attorney, Agent, or Firm—Plante & Strauss

[57] ABSTRACT

There is disclosed an improved automotive clutch in which the clutch diaphragm is supported by rotational bearings, preferably spherical balls which are carried in a circular groove on the upper surface of a raised rim on the pressure plate. In some applications the rotational bearings can also be provided at the fulcrum support for the diaphragm. In the pull-off type of clutch, the base of the diaphragm is supported by rotational bearings carried on the undersurface of the clutch housing cover, and additional rotational bearings are provided on a raised rim on the pressure plate. In either application, the rotational bearings can be spherical balls, or elongated rollers.

12 Claims, 4 Drawing Sheets

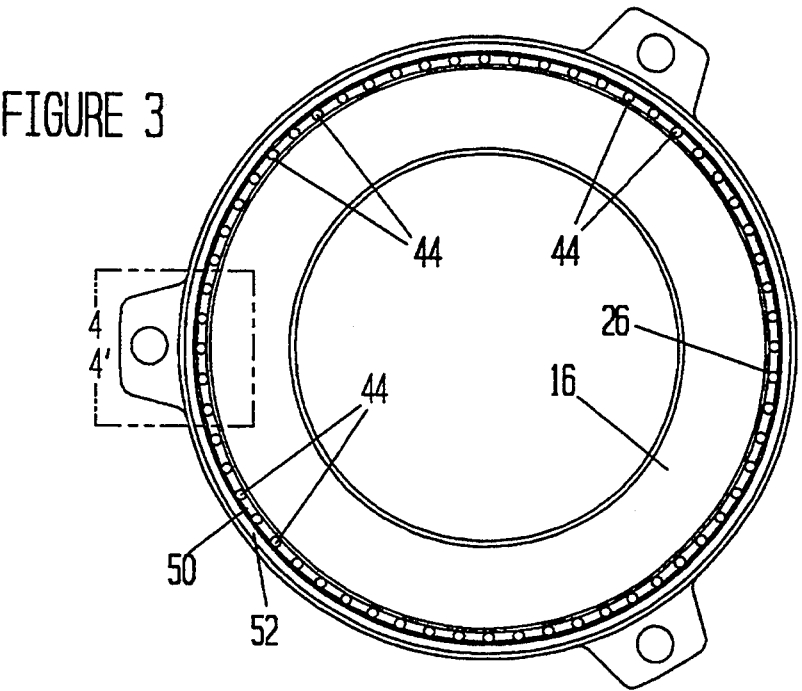
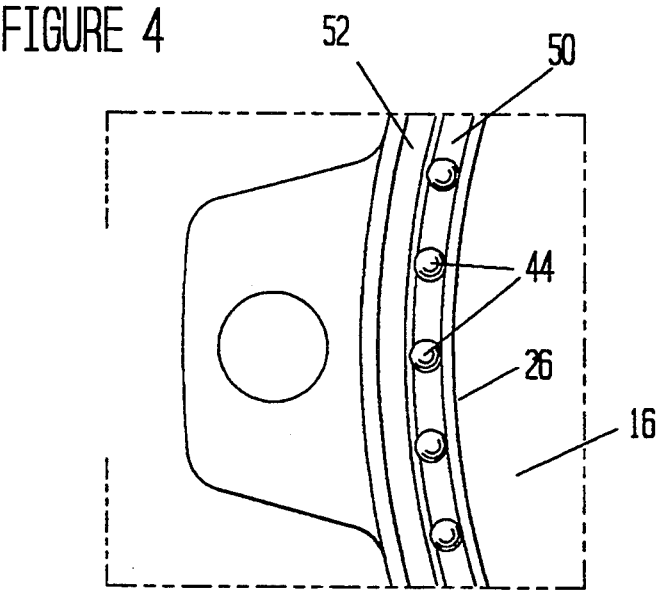

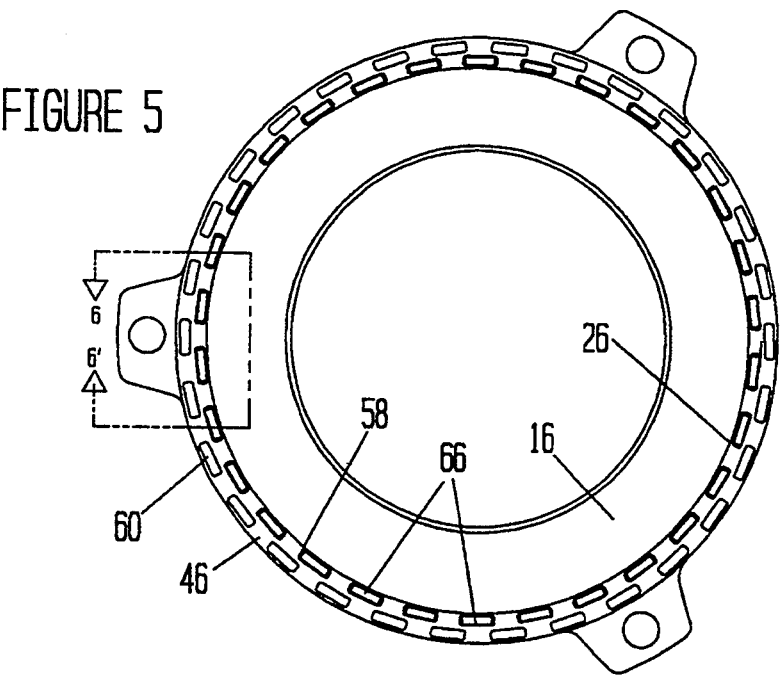
FIGURE 5
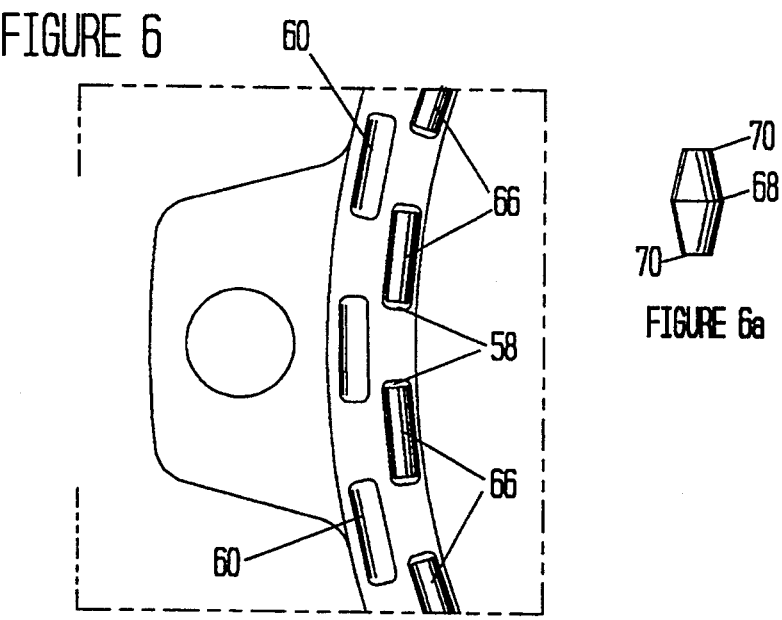
FIGURE 6
FIGURE 6a

AUTOMOTIVE CLUTCHES

BACKGROUND OF THE INVENTION

1. Field Of The Invention

This invention relates to improvements in automotive clutches and, in particular, to an improvement for mounting and supporting diaphragms in diaphragm clutches.

2. Brief Statement of the Prior Art

Diaphragm or Bellville clutches are the most commonly used in the automotive industry. In the typical automotive clutch, the clutch disc is supported between a pressure plate and the flywheel. A clutch housing cover which holds onto the flywheel surrounds the pressure plate and supports a spring diaphragm, also known as a Bellville diaphragm which supplies the clamp load to compress the clutch disc between the pressure plate and flywheel when the clutch is engaged. The diaphragm has a fulcrum support on the clutch housing cover and the base of the diaphragm rests on a raised circular rim on the upper surface of the pressure plate. When the diaphragm reverses its position between clutch engagement and disengagement, the base of the diaphragm rubs against this circular rim, with frictional losses that cause hysterisis in the clamp load between engagement and disengagement, and objectionable wear on the rim of the pressure plate.

The most common diaphragm clutches are the push off type in which a force is applied downwardly against the center fingers of the diaphragm to cause it to move release the pressure plate into a position disengaging the clutch disc. Recent changes, spurred by the desire to minimize size and bulk of automotive components has lead to the development of the pull off type clutch in which a lifting force is applied to the fingers of the diaphragm to release the pressure plate. In this clutch design, the base of the diaphragm rests against the underside of the clutch housing cover, and an inner annular area of the diaphragm bears against the raised rim on the pressure plate.

In both designs, however, the diaphragm rubs against a raised stationary rim of the upper surface of the clutch plate, and the clutches suffer the hysterisis and wear problems previously mentioned.

OBJECTIVES OF THE INVENTION

It is an objective of this invention to provide an improvement in clutches which reduces wear of the diaphragm on the pressure plate of the clutch.

It is also an objective of this invention to provide an automotive clutch with superior operating characteristics.

It is a further object of the invention to provide a modification of an automotive clutch which can be readily retrofitted to existing clutches without substantial machining or replacement of parts.

Other and related objectives will be apparent from the following description of the invention.

BRIEF STATEMENT OF THE INVENTION

This invention comprises an improved automotive clutch design in which the diaphragm is supported by rolling means carried on the pressure plate. In the push-off type clutch, the base of the diaphragm is supported by rolling means, preferably spherical balls which are carried in a circular groove on the upper surface of a raised rim on the pressure plate. In some applications the rolling means are also provided at the fulcrum support for the diaphragm. In the pull-off type of clutch, the base of the diaphragm is supported by rolling means carried on the undersurface of the clutch housing cover, and additional rolling means are provided on a raised rim on the pressure plate. In either application, the rolling means can be spherical balls, or elongated rollers.

BRIEF DESCRIPTION OF THE DRAWINGS

The invention will be described with reference to the figures of which;

FIG. 3 is a plan view of the upper surface of the pressure plate of an automotive clutch modified in accordance with invention;

FIG. 4 is an enlarged view of the area within the box marked 4—4' of FIG. 3;

FIGS. 5, 6 and 6a illustrate rollers which can be used in the invention; and

DESCRIPTION OF PREFERRED EMBODIMENT

Figure 1:
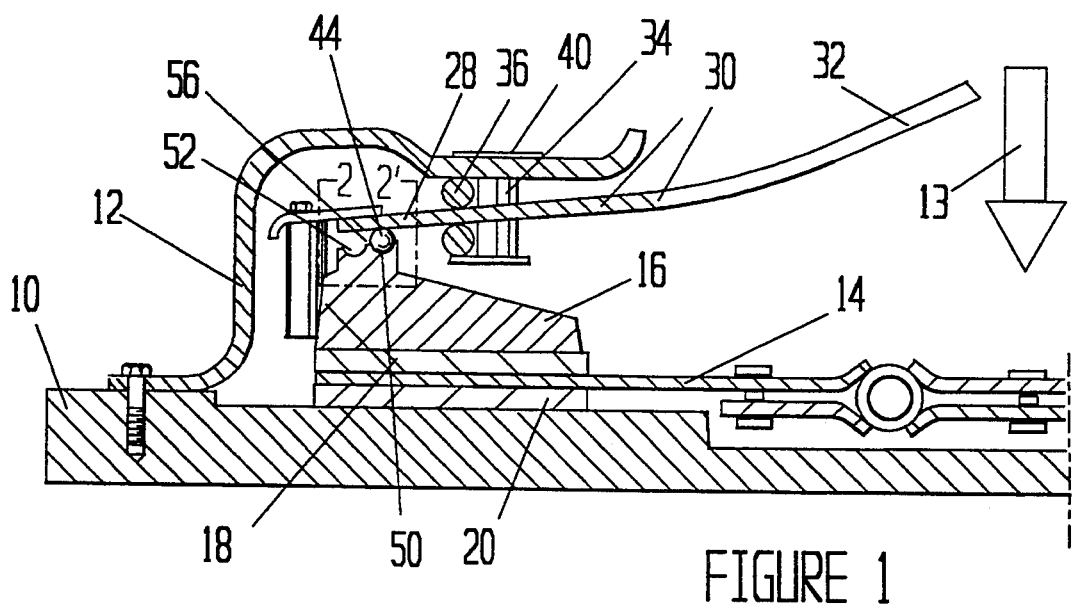
FIG. 1 is an elevational sectional view of a typical push-off automotive clutch modified in accordance with the invention.

Referring to FIG. 1, there is illustrated a sectional view of a conventional automotive clutch which has been modified in accordance with the invention. The clutch is mounted on a flywheel 10 with a clutch cover 12 that surrounds the assembly. A clutch disc 14 is located between the flywheel 10 and the pressure plate 16. Frictional facings 18 and 20 are provided on opposite sides of the clutch disc 14 and engage surfaces on the flywheel 10 and the pressure plate 16. The pressure plate 16 has a raised circular rim 24 on its upper surface 26 which provides a support for the base 28 of the diaphragm 30. The diaphragm 30 is a Bellville conical spring diaphragm which has a plurality of radial slots 32, forming a plurality of fingers. The diaphragm 30 has a fulcrum support 34 on the undersurface of the clutch housing cover 12 which is formed by a pair of rings 36 and 38 which are located above and below the diaphragm 30 and supported by a metal fastener 40 that extends through the housing cover 12. The arrow 13 indicates the direction of the release force to disengage the clutch, hence the name "throw-in" clutch.

The clutch is modified in accordance with this invention by providing a plurality of rolling means, preferably spherical balls 44, which are rotationally supported on the upper edge 46 of the raised circular rim 24 on the upper surface 26 of the pressure plate 16. For this purpose, at least one circular groove 50 is formed in the upper edge 46 of the raised circular rim 24. Preferably, at least one more circular groove 52 is also formed in the upper edge 46 to provide a variable spacing for the base support of the diaphragm 30, thereby permitting one to change the lever arm of the diaphragm 30 and thus provide a selectable control over the clamp load of the diaphragm.

Figure 2:
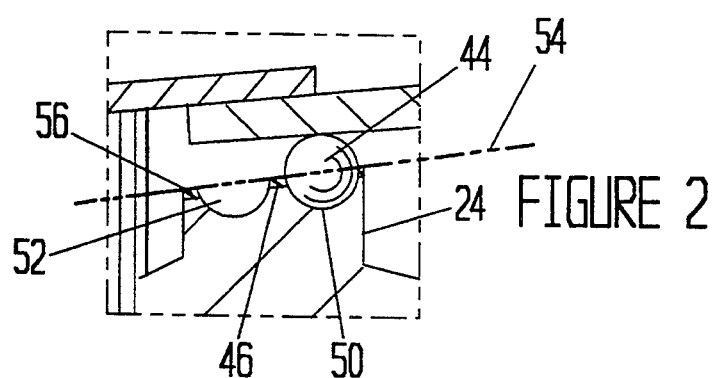
FIG. 2 is an enlarged view of the area within the box marked 2—2' FIG. 1.

Referring now to FIG. 2, the structure will be described in greater detail. As there illustrated, a support ball 44 rests in the innermost circular groove 50. This groove 50 is preferably at a slightly lesser depth than the outer groove 52 so that the balls 44 which rests in these grooves are at slightly lesser elevations in the outer groove 52 than in the inner groove 50, as indicated by the dashed line 54. This avoids any interference of the raised rim 24 with the outer edge of the diaphragm 30.

An optional component of the invention can be a ball retainer 56 which is a ring having a plurality of spaced apart apertures which receive the balls. When the balls 44 are seated in individual spherical recesses, rather than in a circular groove, the ring 56 is not necessary. When the balls are seated in a circular groove such as groove 50 and 52, the retainer ring is quite useful in retaining the balls 44 at their initial spacings. The ring rests on the upper edge 46 of the raised circular rim 24 and insures that the balls remain at the preset incremental angular spacing, e.g., 6 degrees in the illustrated embodiment.

Referring now to FIGS. 3 and 4, the arrangement of the balls in the innermost circular groove 50 of the pressure plate 16 is illustrated. In the illustration, the balls 44 are located at equally spaced apart angular increments; 6 degrees. As previously mentioned, the balls can be retained at equal angular spacings by various retainer means, such as the retainer ring 56 (see FIGS. 1 and 2). For clarity of illustration, the retainer ring 56 is not illustrated in FIGS. 3 and 4.

An alternative rolling means comprises elongated rollers and these are shown in FIGS. 5 and 6 which are views corresponding to views 3 and 4. In this application the upper edge 46 of the raised circular rim 24 is provided with a plurality of cylindrical walled recesses 58 at equal angular increments, e.g., every 12 degrees. If desired, an outer circular array 60 of recesses 58, and an inner circular array 62 of recesses 58 can be provided. The recesses are elongated and have cylindrical side walls 64 (see FIG. 6) to receive rollers 66, which are placed in each recess of either the inner circular array 62 or the outer circular array 60.

Preferably the rollers are right cylindrical rollers, as illustrated in FIGS. 5 and 6. If desired, however, the rollers can be of the form illustrated in FIG. 6a, with a large diameter center 68 and tapering to smaller diameter ends 70. These surfaces can be conical, as shown, or can be curvilinear, as desired.

Figure 7:
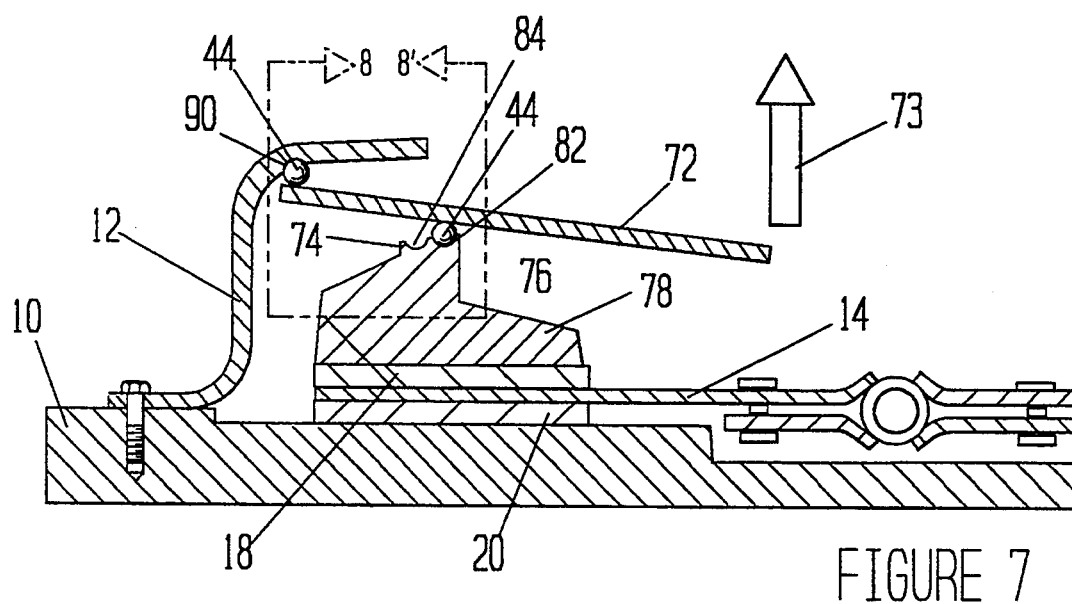
FIGS. 7 and 8 illustrate a pull-off automotive clutch modified in accordance with the invention.
Figure 8:
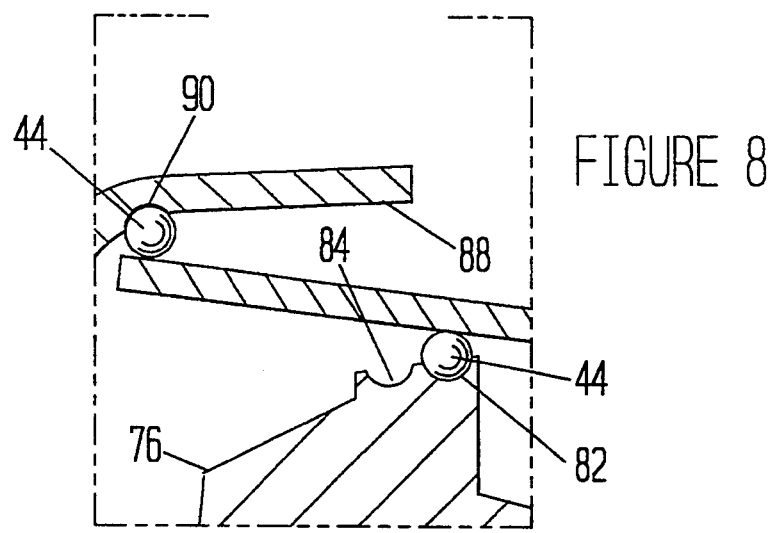

Referring now to FIGS. 7 and 8, there is illustrated a sectional elevational view of a throw out clutch mechanism. As with the throw-in clutch shown in FIGS. 1 and 2, the diaphragm 72 applies a clamp load to the pressure plate 72. The direction of the release force is shown by arrow 73. In this application, the diaphragm 72 has a fulcrum support on balls 44 which are carried on the upper edge 74 of a raised circular rim 76 on the upper face 80 of the pressure plate 78. As with the previously described embodiments, the balls are placed in a circular groove 82 in edge 74 of rim 76. If desired, to provide adjustment of the throw out force, one or more circular grooves such as 84 can be provided. The balls 44 provide rolling contact support at the fulcrum location for the diaphragm 72.

The base 86 of the diaphragm 72 is supported by another circular array of balls 44 which are located on the undersurface 88 of the clutch cover. The balls can be placed in spherical recesses 90 in the undersurface 88 of the clutch cover 12, or in a circular groove in the undersurface 88 of the clutch cover 12, such as grooves 50 and 52 described with reference to FIGS. 3 and 4. Alternatively, rollers can be positioned in slots in the undersurface of the clutch cover, substantially as previously described with regard to FIGS. 5 and 6.

The invention reduces the area of the contact between the diaphragm and its supports on the pressure plate, and/or on the clutch cover. This reduction in contacting area reduces the frictional drag on the engagement and disengagement of the clutch and avoids the hysterisis exhibited with conventional clutches. Further, the balls or rollers preferably provide a rolling bearing surface which further reduces the frictional drag. Another significant advantage is that the reduced area of contact between the pressure plate and diaphragm greatly reduces thermal conduction between these components, with the result that runs cooler, as there is less heat transfer from the pressure plate.

The balls can be formed of hard steel, either from hard steel alloys or case hardened. This permits use of lighter metals for construction of the pressure plate, e.g., the use of aluminum or magnesium, or their alloys, or high strength reinforced plastics for ultra light pressure plates with no sacrifice of wear resistance.

Since the invention does not radically change the design of automotive clutches, it can be readily adopted to existing clutches by replacement of the pressure plate, and in some instances by machining or replacement of the clutch cover. This avoids any significant new expenditures for tooling by the original manufacturer, and also permits retrofitting of existing vehicles, since replacement of the necessary parts is within the capability of conventional automotive shops and garages.

The invention also provides a simple adjustment capability to modify the clamp pressure and the pedal pressure of clutches by permitting the mechanic to relocate the bearing points on the diaphragm, simply by changing the location of the balls, or rollers on the pressure plate, which changes the lever arm of the diaphragm.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In an automotive clutch having a clutch disc supported between a flywheel and pressure plate with a spring diaphragm biased between a pressure plate and the clutch cover to compress said clutch disc between said pressure plate and flywheel, the improvement which comprises: at least one circular groove formed in at least one of said pressure plate and said cover, a plurality of circumferentially spaced-apart balls received in said at least one groove and a ball retainer ring received between at least one of said pressure plate and clutch cover and said diaphragm to provide a bearing contact surface between said diaphragm and said one of said pressure plate and clutch cover, and said ball retainer has a like plurality of recesses, one each receiving one of said balls to maintain separation of said balls.

2. The improvement of claim 1 wherein said balls are received between said diaphragm and said pressure plate.

3. The improvement of claim 2 including support means on the upper surface of said pressure plate to support said balls.

4. The improvement of claim 1 wherein said pressure plate has a raised circular rim about its upper face which includes a circular groove in the upper edge of said rim, and with said balls received in said circular groove.

5. The improvement of claim 4 including at least two circular grooves of different diameters to receive said balls and thereby permit variable selection of the clamp pressure of the clutch by selection of the circular groove in which the balls are supported.

6. The improvement of claim 1 wherein said balls and retainer ring are received between said diaphragm and the undersurface of said clutch cover.

7. The improvement of claim 6 including ball recess means to receive said balls in the undersurface of said clutch cover.

8. The improvement of claim 7 wherein said ball recess means is a circular groove in the undersurface of said clutch cover.

9. The improvement of claim 7 wherein said ball recess means comprise a plurality of arcuate recesses located at spaced-apart angular increments in the undersurface of said clutch cover and wherein each of said recesses receives one of said spherical balls.

10. The improvement of claim 7 including a second plurality of spherical balls carried on said pressure plate.

11. The improvement of claim 10 including a second ball retainer ring between the upper surface of said pressure plate and said diaphragm.

12. The improvement of claim 11 wherein said pressure plate has a raised circular rim about its upper face which includes a circular groove in the upper edge of said rim, and said second plurality of balls are received in said circular groove.

* * * * *